United States Patent
Moolman et al.

(10) Patent No.: US 11,524,921 B2
(45) Date of Patent: Dec. 13, 2022

(54) COMPOSITE MATERIALS CONTAINING HEMP AND NANOCELLULOSE

(71) Applicant: Russell Moolman, Atlanta, GA (US)

(72) Inventors: Russell Moolman, Atlanta, GA (US); Theodora Retsina, Atlanta, GA (US)

(73) Assignee: Russell Moolman, Atlanta, GA (US)

( * ) Notice: Subject to any disclaimer, the term of this patent is extended or adjusted under 35 U.S.C. 154(b) by 485 days.

(21) Appl. No.: 16/273,267

(22) Filed: Feb. 12, 2019

(65) Prior Publication Data

US 2019/0248987 A1 Aug. 15, 2019

Related U.S. Application Data

(60) Provisional application No. 62/629,732, filed on Feb. 13, 2018.

(51) Int. Cl.

| | |
|---|---|
| *C08L 1/02* | (2006.01) |
| *C04B 18/24* | (2006.01) |
| *C08J 5/04* | (2006.01) |
| *C04B 20/00* | (2006.01) |
| *C04B 24/38* | (2006.01) |
| *C04B 26/28* | (2006.01) |
| *C04B 30/02* | (2006.01) |
| *C04B 28/10* | (2006.01) |
| *B82Y 30/00* | (2011.01) |
| *C04B 111/00* | (2006.01) |
| *C04B 111/28* | (2006.01) |

(52) U.S. Cl.
CPC .......... *C04B 18/248* (2013.01); *C04B 20/008* (2013.01); *C04B 24/383* (2013.01); *C04B 26/285* (2013.01); *C04B 28/10* (2013.01); *C04B 30/02* (2013.01); *C08J 5/045* (2013.01); *C08L 1/02* (2013.01); *B82Y 30/00* (2013.01); *C04B 2111/00482* (2013.01); *C04B 2111/28* (2013.01)

(58) Field of Classification Search
CPC .......... C08L 1/02; C08J 5/045; C04B 20/008; C04B 24/383; C04B 18/248; B82Y 30/00
See application file for complete search history.

(56) References Cited

U.S. PATENT DOCUMENTS 8,871,057 B2 * 10/2014 Gane .................... D21H 17/675
162/181.1

* cited by examiner

*Primary Examiner* — Leigh C Maier
*Assistant Examiner* — Everett White
(74) *Attorney, Agent, or Firm* — O'Connor & Company; Ryan P. O'Connor

(57) ABSTRACT

Disclosed is a new composite material comprising nanocellulose and hemp or a hemp-derived component, such as pure hemp, hemp bast fibers, hemp inner fibers, hemp shives, hemp leaves, hemp seeds, or ground hemp. The nanocellulose may be hydrophobic or hydrophilic, and may include cellulose nanocrystals, cellulose nanofibrils, cellulose microfibrils, or a combination thereof. This invention provides construction blocks or panels; engineered parts; fire-resistant objects; coatings; containers; textile compositions; and fabric materials, for example. The composite material may also include one or more additives to modify mechanical, thermal, chemical, and/or electrical properties. The addition of nanocellulose can improve the mechanical properties of hemp-containing concrete mixtures to improve compressive strength for construction purposes.

20 Claims, No Drawings

COMPOSITE MATERIALS CONTAINING HEMP AND NANOCELLULOSE

PRIORITY DATA

This patent application claims priority to U.S. Provisional Patent App. No. 62/629,732, filed on Feb. 13, 2018, which is hereby incorporated by reference herein.

FIELD

The present invention generally relates to composite materials containing hemp and nanocellulose.

BACKGROUND

Hemp is a variety of the *Cannabis sativa* plant species that is grown specifically for the industrial uses of its derived products. Hemp is one of the fastest growing plants and was one of the first plants to be spun into usable fiber 10,000 years ago. Hemp can be refined into a variety of commercial items including paper, textiles, clothing, biodegradable plastics, paint, insulation, biofuel, food, and animal feed.

"Hempcrete" is bio-composite material, a mixture of hemp hurds (shives) and lime (possibly with sand and/or pozzolans) used as a material for construction and insulation. Hempcrete is easier to work with than traditional lime mixes and acts as an insulator and moisture regulator. It lacks the brittleness of concrete and consequently does not need expansion joints. The result is a lightweight insulating material.

However, the typical compressive strength of hempcrete is about 1 MPa, which is over an order of magnitude lower than the compressive strength residential-grade concrete. Hempcrete walls must be used together with a frame of another material that supports the vertical load in building construction, due to low density and strength.

There is a desire to improve the properties of hempcrete with a material that is natural, renewable, and sustainable. There is also a desire to provide composites containing hemp that have expanded commercial uses beyond construction materials, such as engineered parts, coatings, containers, textiles, and so on.

SUMMARY

Some variations of the invention provide a composite material comprising nanocellulose and hemp or a hemp-derived component. In some embodiments, the composite material consists essentially of nanocellulose and hemp or a hemp-derived component.

The composite material may contain one or more hemp components selected from the group consisting of hemp bast fibers, hemp inner fibers, hemp shives, hemp leaves, hemp seeds, ground hemp, and combinations thereof. In certain embodiments, the composite material contains substantially pure hemp.

In some embodiments, the composite material contains chemically modified hemp and/or chemically modified hemp components.

In some embodiments, the nanocellulose contains hydrophobic nanocellulose particles, such as lignin-coated nanocellulose particles or lignin-containing nanocellulose particles.

In some embodiments, the nanocellulose particles include hydrophilic nanocellulose particles.

The nanocellulose may include cellulose nanocrystals, cellulose nanofibrils, cellulose microfibrils, or a combination thereof.

The source of the nanocellulose is not limited. In some variations, the nanocellulose is obtained from a process of fractionating biomass in the presence of an acid catalyst, a solvent for lignin, and water to generate cellulose-rich solids, hemicelluloses, and lignin; separating the cellulose-rich solids from the hemicelluloses and the lignin; and then mechanically refining the cellulose-rich solids to generate the nanocellulose particles.

In some variations, the nanocellulose is obtained from a process of pretreating biomass in the presence of steam or hot water to generate cellulose-rich solids and hemicelluloses; separating the cellulose-rich solids from the hemicelluloses; and then mechanically refining the cellulose-rich solids to generate the nanocellulose particles.

The composition of the composite material may vary widely. In some embodiments, the nanocellulose is present at a concentration from about 0.1 wt % to about 99.9 wt % of the composite material, and the hemp or hemp-derived component is present at a concentration from about 0.1 wt % to about 99.9 wt % of the composite material. In certain embodiments, the composite material contains at least 10 wt % nanocellulose, or at least 10 wt % hemp or hemp-derived component(s), or both at least 10 wt % nanocellulose and at least 10 wt % hemp or hemp-derived component(s).

In some embodiments, the composite material further comprises one or more additives selected to modify mechanical, thermal, chemical, and/or electrical properties of the composite material. For example, the composite material may include an additive selected from the group consisting of lime, sand, gravel, crushed stone, slag, recycled concrete, geosynthetic aggregates, and combinations thereof. In certain embodiments, the additive is lime and the composite material is in the form of a construction block, panel, or other building object.

The present invention provides many types of composite materials and objects containing those materials. Embodiments include a construction block, panel, or other object comprising nanocellulose and hemp or a hemp-derived component; an engineered part comprising nanocellulose and hemp or a hemp-derived component; a fire-resistant object comprising nanocellulose and hemp or a hemp-derived component; a coating comprising nanocellulose and hemp or a hemp-derived component; a container comprising nanocellulose and hemp or a hemp-derived component; a textile composition comprising nanocellulose and hemp or a hemp-derived component; and a fabric material comprising nanocellulose and hemp or a hemp-derived component.

Some variations of the invention provide a process of producing a composite material (as disclosed herein), the process comprising:

(a) obtaining nanocellulose;

(b) obtaining hemp or a hemp-derived component; and (c) blending the nanocellulose with the hemp or hemp-derived component, thereby forming a composite material comprising the nanocellulose and the hemp or hemp-derived component.

DETAILED DESCRIPTION OF SOME EMBODIMENTS

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing parameters, reaction conditions, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of" and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

This disclosure is premised on the incorporation of nanocellulose into hemp or hemp components to form a composite material for a wide variety of uses.

Certain exemplary embodiments of the invention will now be described. These embodiments are not intended to limit the scope of the invention as claimed. The order of steps may be varied, some steps may be omitted, and/or other steps may be added. Reference herein to first step, second step, etc. is for purposes of illustrating some embodiments only.

Some variations of the invention provide a composite material comprising nanocellulose and hemp or a hemp-derived component. In some embodiments, the composite material consists essentially of nanocellulose and hemp or a hemp-derived component.

The composite material may contain one or more hemp components selected from the group consisting of hemp bast fibers, hemp inner fibers, hemp shives, hemp leaves, hemp seeds, ground hemp, and combinations thereof. In certain embodiments, the composite material contains substantially pure hemp.

In some embodiments, the composite material contains chemically modified hemp and/or chemically modified hemp components.

In some embodiments, the nanocellulose contains hydrophobic nanocellulose particles, such as lignin-coated nanocellulose particles or lignin-containing nanocellulose particles.

In some embodiments, the nanocellulose particles include hydrophilic nanocellulose particles.

The nanocellulose may include cellulose nanocrystals, cellulose nanofibrils, cellulose microfibrils, or a combination thereof.

The source of the nanocellulose is not limited. In some variations, the nanocellulose is obtained from a process of fractionating biomass in the presence of an acid catalyst, a solvent for lignin, and water to generate cellulose-rich solids, hemicelluloses, and lignin; separating the cellulose-rich solids from the hemicelluloses and the lignin; and then mechanically refining the cellulose-rich solids to generate the nanocellulose particles.

In some variations, the nanocellulose is obtained from a process of pretreating biomass in the presence of steam or hot water to generate cellulose-rich solids and hemicelluloses; separating the cellulose-rich solids from the hemicelluloses; and then mechanically refining the cellulose-rich solids to generate the nanocellulose particles.

Nanocellulose may also be produced by refining purchased pulp (including kraft pulp, sulfite pulp, etc.). Nanocellulose may also be purchased, i.e. obtained from the market.

The composition of the composite material may vary widely. In some embodiments, the nanocellulose is present at a concentration from about 0.1 wt % to about 99.9 wt % of the composite material, and the hemp or hemp-derived component is present at a concentration from about 0.1 wt % to about 99.9 wt % of the composite material. The combination of nanocellulose and hemp does not necessarily add to 100% because other components may be present. Exemplary composite materials contain, without limitation, from 0.1 wt % to 20 wt % nanocellulose along with from 30 wt % to 99 wt % hemp or hemp-derived component(s); from 1 wt % to 50 wt % nanocellulose along with from 25 wt % to 75 wt % hemp or hemp-derived component(s); or 5 wt % to 25 wt % nanocellulose along with from 25 wt % to 95 wt % hemp or hemp-derived component(s). In certain embodiments, the composite material contains at least 10 wt % nanocellulose, or at least 10 wt % hemp or hemp-derived component(s), or both at least 10 wt % nanocellulose and at least 10 wt % hemp or hemp-derived component(s).

In some embodiments, the composite material further comprises one or more additives selected to modify mechanical, thermal, chemical, and/or electrical properties of the composite material. For example, the composite material may include an additive selected from the group consisting of lime, sand, gravel, crushed stone, slag, recycled concrete, geosynthetic aggregates, and combinations thereof. In certain embodiments, the additive is lime (and potentially other components) and the composite material is in the form of a construction block, panel, or other building object. In this case, the addition of nanocellulose can improve the mechanical properties of the material known as "hempcrete" such as to improve compressive strength for construction purposes.

Optionally, additives such as flame retardants may be included in the composite material, such as to enhance the fire resistance, or for other reasons, including aesthetic reasons (e.g., color or texture).

The present invention provides many types of composite materials and objects containing those materials. Embodiments include a construction block, panel, or other object comprising nanocellulose and hemp or a hemp-derived component; an engineered part comprising nanocellulose and hemp or a hemp-derived component; a fire-resistant object comprising nanocellulose and hemp or a hemp-derived component; a coating comprising nanocellulose and hemp or a hemp-derived component; a container comprising nanocellulose and hemp or a hemp-derived component; a textile composition comprising nanocellulose and hemp or a hemp-derived component; and a fabric material comprising nanocellulose and hemp or a hemp-derived component.

Some variations of the invention provide a process of producing a composite material (as disclosed herein), the process comprising:

(a) obtaining nanocellulose;
(b) obtaining hemp or a hemp-derived component; and
(c) blending the nanocellulose with the hemp or hemp-derived component, thereby forming a composite material comprising the nanocellulose and the hemp or hemp-derived component.

The present invention, in some variations, utilizes nanocellulose produced under process conditions associated with the AVAP® process. Very high crystallinity can be produced and maintained during formation of nanofibers or nanocrystals, without the need for an enzymatic or separate acid treatment step to hydrolyze amorphous cellulose. High crystallinity can translate to mechanically strong fibers or good physical reinforcing properties, which are advantageous for composites, reinforced polymers, and high-strength spun fibers and textiles, for example.

As intended herein, "nanocellulose" is broadly defined to include a range of cellulosic materials, including but not limited to microfibrillated cellulose, nanofibrillated cellulose, microcrystalline cellulose, nanocrystalline cellulose, and particulated or fibrillated dissolving pulp. Typically, nanocellulose as provided herein will include particles having at least one length dimension (e.g., diameter) on the nanometer scale.

"Nanofibrillated cellulose" or equivalently "cellulose nanofibrils" means cellulose fibers or regions that contain nanometer-sized particles or fibers, or both micron-sized and nanometer-sized particles or fibers. "Nanocrystalline cellulose" or equivalently "cellulose nanocrystals" means cellulose particles, regions, or crystals that contain nanometer-sized domains, or both micron-sized and nanometer-sized domains. "Micron-sized" includes from 1 to 100 µm and "nanometer-sized" includes from 0.01 nm to 1000 nm (1 µm). Larger domains (including long fibers) may also be present in these materials.

Biomass-derived pulp may be converted to nanocellulose by mechanical processing. Although the process may be simple, disadvantages include high energy consumption, damage to fibers and particles due to intense mechanical treatment, and a broad distribution in fibril diameter and length.

Biomass-derived pulp may be converted to nanocellulose by chemical processing. For example, pulp may be treated with 2,2,6,6-tetramethylpiperidine-1-oxy radical (TEMPO) to produce nanocellulose. Such a technique reduces energy consumption compared to mechanical treatment and can produce more uniform particle sizes.

In some variations, a process for producing a nanocellulose material comprises:

(a) providing a lignocellulosic biomass feedstock;
(b) fractionating the feedstock in the presence of an acid, a solvent for lignin, and water, to generate cellulose-rich solids and a liquid containing hemicellulose and lignin;
(c) mechanically treating the cellulose-rich solids to form cellulose fibrils and/or cellulose crystals, thereby generating a nanocellulose material having a crystallinity (i.e., cellulose crystallinity) of at least 60%; and
(d) recovering the nanocellulose material.

In some embodiments, the acid is selected from the group consisting of sulfur dioxide, sulfurous acid, sulfur trioxide, sulfuric acid, lignosulfonic acid, and combinations thereof. In particular embodiments, the acid is sulfur dioxide.

The biomass feedstock to produce the nanocellulose may be selected from hardwoods, softwoods, forest residues, eucalyptus, industrial wastes, pulp and paper wastes, consumer wastes, or combinations thereof. In some embodiments, the biomass feedstock is hemp (different from the hemp that is later combined with the nanocellulose). Some embodiments utilize agricultural residues, which include lignocellulosic biomass associated with food crops, annual grasses, energy crops, or other annually renewable feedstocks. Exemplary agricultural residues include, but are not limited to, corn stover, corn fiber, wheat straw, sugarcane bagasse, sugarcane straw, rice straw, oat straw, barley straw, miscanthus, energy cane straw/residue, or combinations thereof. This process benefits from feedstock flexibility; it is effective for a wide variety of cellulose-containing feedstocks.

As used herein, "lignocellulosic biomass" means any material containing cellulose and lignin. Lignocellulosic biomass may also contain hemicellulose. Mixtures of one or more types of biomass can be used. In some embodiments, the biomass feedstock comprises both a lignocellulosic component (such as one described above) in addition to a sucrose-containing component (e.g., sugarcane or energy cane) and/or a starch component (e.g., corn, wheat, rice, etc.). Various moisture levels may be associated with the starting biomass. The biomass feedstock need not be, but may be, relatively dry. In general, the biomass is in the form of a particulate or chip, but particle size is not critical in this invention.

In some embodiments, during step (c), the cellulose-rich solids are treated with a total mechanical energy of less than about 5000 kilowatt-hours per ton of the cellulose-rich solids, such as less than about 4000, 3000, 2000, or 1000 kilowatt-hours per ton of the cellulose-rich solids. Energy consumption may be measured in any other suitable units. An ammeter measuring current drawn by a motor driving the mechanical treatment device is one way to obtain an estimate of the total mechanical energy.

Mechanically treating in step (c) may employ one or more known techniques such as, but by no means limited to, milling, grinding, beating, sonicating, or any other means to form or release nanofibrils and/or nanocrystals in the cellulose. Essentially, any type of mill or device that physically separates fibers may be utilized. Such mills are well-known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. See, for example, Smook, *Handbook for Pulp & Paper Technologists*, Tappi Press, 1992; and Hubbe et al., "Cellulose Nanocomposites: A Review," *BioResources* 3(3), 929-980 (2008).

The extent of mechanical treatment may be monitored during the process by any of several means. Certain optical instruments can provide continuous data relating to the fiber length distributions and % fines, either of which may be used to define endpoints for the mechanical treatment step. The time, temperature, and pressure may vary during mechanical treatment. For example, in some embodiments, sonication for a time from about 5 minutes to 2 hours, at ambient temperature and pressure, may be utilized.

In some embodiments, a portion of the cellulose-rich solids is converted to nanofibrils while the remainder of the cellulose-rich solids is not fibrillated. In various embodiments, about 10%, 20%, 30%, 40%, 50%, 60%, 70%, 80%, 90%, 95%, 99%, or substantially all of the cellulose-rich solids are fibrillated into nanofibrils.

In some embodiments, a portion of the nanofibrils is converted to nanocrystals while the remainder of the nanofibrils is not converted to nanocrystals. In various embodiments, about 10%, 20%, 30%, 40%, 50%, 60%, 70%, 80%, 90%, 95%, 99%, or substantially all of the nanofibrils are converted to nanocrystals. During drying, it is possible for a small amount of nanocrystals to come back together and form nanofibrils.

Following mechanical treatment, the nanocellulose material may be classified by particle size. A portion of material may be subjected to a separate process, such as enzymatic hydrolysis to produce glucose. Such material may have good crystallinity, for example, but may not have desirable particle size or degree of polymerization.

Step (c) may further comprise treatment of the cellulose-rich solids with one or more enzymes or with one or more acids. When acids are employed, they may be selected from the group consisting of sulfur dioxide, sulfurous acid, ligno-sulfonic acid, acetic acid, formic acid, and combinations thereof. Acids associated with hemicellulose, such as acetic acid or uronic acids, may be employed, alone or in conjunction with other acids. Also, step (c) may include treatment of the cellulose-rich solids with heat. In some embodiments, step (c) does not employ any enzymes or acids.

In step (c), when an acid is employed, the acid may be a strong acid such as sulfuric acid, nitric acid, or phosphoric acid, for example. Weaker acids may be employed, under more severe temperature and/or time. Enzymes that hydrolyze cellulose (i.e., cellulases) and possibly hemicellulose (i.e., with hemicellulase activity) may be employed in step (c), either instead of acids, or potentially in a sequential configuration before or after acidic hydrolysis.

In some embodiments, the process comprises enzymatically treating the cellulose-rich solids to hydrolyze amorphous cellulose. In other embodiments, or sequentially prior to or after enzymatic treatment, the process may comprise acid-treating the cellulose-rich solids to hydrolyze amorphous cellulose.

In some embodiments, the process further comprises enzymatically treating the nanocrystalline cellulose. In other embodiments, or sequentially prior to or after enzymatic treatment, the process further comprises acid-treating treating the nanocrystalline cellulose.

If desired, an enzymatic treatment may be employed prior to, or possibly simultaneously with, the mechanical treatment. However, in preferred embodiments, no enzyme treatment is necessary to hydrolyze amorphous cellulose or weaken the structure of the fiber walls before isolation of nanofibers.

Following mechanical treatment, the nanocellulose may be recovered. Separation of cellulose nanofibrils and/or nanocrystals may be accomplished using apparatus capable of disintegrating the ultrastructure of the cell wall while preserving the integrity of the nanofibrils. For example, a homogenizer may be employed. In some embodiments, cellulose aggregate fibrils are recovered, having component fibrils in range of 1-100 nm width, wherein the fibrils have not been completely separated from each other.

The process may further comprise bleaching the cellulose-rich solids prior to step (c) and/or as part of step (c). Alternatively, or additionally, the process may further comprise bleaching the nanocellulose material during step (c) and/or following step (c). Any known bleaching technology or sequence may be employed, including enzymatic bleaching.

The nanocellulose material may include, or consist essentially of, nanofibrillated cellulose. The nanocellulose material may include, or consist essentially of, nanocrystalline cellulose. In some embodiments, the nanocellulose material may include, or consist essentially of, nanofibrillated cellulose and nanocrystalline cellulose.

In some embodiments, the crystallinity of the cellulose-rich solids (i.e., the nanocellulose precursor material) is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. In these or other embodiments, the crystallinity of the nanocellulose material is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. The crystallinity may be measured using any known techniques. For example, X-ray diffraction or solid-state $^{13}C$ nuclear magnetic resonance may be utilized.

In some embodiments, the nanocellulose material is characterized by an average degree of polymerization from about 100 to about 1500, such as about 125, 150, 175, 200, 225, 250, 300, 400, 500, 600, 700, 800, 900, 1000, 1100, 1200, 1300, or 1400. For example, the nanocellulose material may be characterized by an average degree of polymerization from about 300 to about 700, or from about 150 to about 250. The nanocellulose material, when in the form of nanocrystals, may have a degree of polymerization less than 100, such as about 75, 50, 25, or 10. Portions of the material may have a degree of polymerization that is higher than 1500, such as about 2000, 3000, 4000, or 5000.

In some embodiments, the nanocellulose material is characterized by a degree of polymerization distribution having a single peak. In other embodiments, the nanocellulose material is characterized by a degree of polymerization distribution having two peaks, such as one centered in the range of 150-250 and another peak centered in the range of 300-700.

In some embodiments, the nanocellulose material is characterized by an average length-to-width aspect ratio of particles from about 10 to about 1000, such as about 15, 20, 25, 35, 50, 75, 100, 150, 200, 250, 300, 400, or 500. Nanofibrils are generally associated with higher aspect ratios than nanocrystals. Nanocrystals, for example, may have a length range of about 100 nm to 500 nm and a diameter of about 4 nm, translating to an aspect ratio of 25 to 125. Nanofibrils may have a length of about 2000 nm and diameter range of 5 to 50 nm, translating to an aspect ratio of 40 to 400. In some embodiments, the aspect ratio is less than 50, less than 45, less than 40, less than 35, less than 30, less than 25, less than 20, less than 15, or less than 10.

Optionally, the process further comprises hydrolyzing amorphous cellulose into glucose in step (b) and/or step (c), recovering the glucose, and fermenting the glucose to a fermentation product. Optionally, the process further comprises recovering, fermenting, or further treating hemicellulosic sugars derived from the hemicellulose. Optionally, the process further comprises recovering, combusting, or further treating the lignin.

Glucose that is generated from hydrolysis of amorphous cellulose may be integrated into an overall process to produce ethanol, or another fermentation co-product. Thus in some embodiments, the process further comprises hydrolyzing amorphous cellulose into glucose in step (b) and/or step (c), and recovering the glucose. The glucose may be purified and sold. Or the glucose may be fermented to a fermentation product, such as but not limited to ethanol. The glucose or a fermentation product may be recycled to the front end, such as to hemicellulose sugar processing, if desired.

When hemicellulosic sugars are recovered and fermented, they may be fermented to produce a monomer or precursor thereof. The monomer may be polymerized to produce a polymer, which may then be combined with the nanocellulose material and the hemp or hemp components to form a composite.

In some embodiments, the nanocellulose material is at least partially hydrophobic via deposition of at least some of the lignin onto a surface of the cellulose-rich solids during step (b). In these or other embodiments, the nanocellulose material is at least partially hydrophobic via deposition of at least some of the lignin onto a surface of the nanocellulose material during step (c) or step (d).

In some embodiments, the process further comprises chemically converting the nanocellulose material to one or more nanocellulose derivatives. For example, nanocellulose derivatives may be selected from the group consisting of nanocellulose esters, nanocellulose ethers, nanocellulose ether esters, alkylated nanocellulose compounds, cross-linked nanocellulose compounds, acid-functionalized nanocellulose compounds, base-functionalized nanocellulose compounds, and combinations thereof.

Various types of nanocellulose functionalization or derivatization may be employed, such as functionalization using polymers, chemical surface modification, functionalization using nanoparticles (i.e. other nanoparticles besides the nanocellulose), modification with inorganics or surfactants, or biochemical modification.

A significant factor limiting the application of strength-enhancing, lightweight nanocellulose in composites is cellulose's inherent hydrophilicity. Surface modification of the nanocellulose surface to impart hydrophobicity to enable uniform dispersion in a hydrophobic polymer matrix is an active area of study. It has been discovered that when preparing nanocellulose using the processes described herein, lignin may condense on pulp under certain conditions, giving a rise in Kappa number and production of a brown or black material. The lignin increases the hydrophobicity of the nanocellulose precursor material, and that hydrophobicity is retained during mechanical treatment provided that there is not removal of the lignin through bleaching or other steps. (Some bleaching may still be performed, either to adjust lignin content or to attack a certain type of lignin, for example.)

In some embodiments, the present invention provides a process for producing a hydrophobic nanocellulose material, the process comprising:
(a) providing a lignocellulosic biomass feedstock;
(b) fractionating the feedstock in the presence of an acid, a solvent for lignin, and water, to generate cellulose-rich solids and a liquid containing hemicellulose and lignin, wherein a portion of the lignin deposits onto a surface of the cellulose-rich solids, thereby rendering the cellulose-rich solids at least partially hydrophobic;
(c) mechanically treating the cellulose-rich solids to form cellulose fibrils and/or cellulose crystals, thereby generating a hydrophobic nanocellulose material having a crystallinity of at least 60%; and
(d) recovering the hydrophobic nanocellulose material.

Step (b) may include process conditions, such as extended time and/or temperature, or reduced concentration of solvent for lignin, which tend to promote lignin deposition onto fibers. Alternatively, or additionally, step (b) may include one or more washing steps that are adapted to deposit at least some of the lignin that was solubilized during the initial fractionation. One approach is to wash with water rather than a solution of water and solvent. Because lignin is generally not soluble in water, it will begin to precipitate. Optionally, other conditions may be varied, such as pH and temperature, during fractionation, washing, or other steps, to optimize the amount of lignin deposited on surfaces. It is noted that in order for the lignin surface concentration to be higher than the bulk concentration, the lignin needs to be first pulled into solution and then redeposited; internal lignin (within particles of nanocellulose) does not enhance hydrophobicity in the same way.

Optionally, the process for producing a hydrophobic nanocellulose material may further include chemically modifying the lignin to increase hydrophobicity of the nanocellulose material. The chemical modification of lignin may be conducted during step (b), step (c), step (d), following step (d), or some combination.

High loading rates of lignin have been achieved in thermoplastics. Even higher loading levels are obtained with well-known modifications of lignin. The preparation of useful polymeric materials containing a substantial amount of lignin has been the subject of investigations for more than thirty years. Typically, lignin may be blended into polyolefins or polyesters by extrusion up to 25-40 wt % while satisfying mechanical characteristics. In order to increase the compatibility between lignin and other hydrophobic polymers, different approaches have been used. For example, chemical modification of lignin may be accomplished through esterification with long-chain fatty acids.

Any known chemical modifications may be carried out on the lignin, to further increase the hydrophobic nature of the lignin-coated nanocellulose material provided by embodiments of this invention.

A product (incorporating the composite material) may include any of the disclosed compositions. Many products are possible. For example, a product may be selected from the group consisting of a structural object, a foam, an aerogel, a polymer composite, a carbon composite, a film, a coating, a coating precursor, a current or voltage carrier, a filter, a membrane, a catalyst, a catalyst substrate, a coating additive, a paint additive, an adhesive additive, a cement replacement or additive, a paper coating, a thickening agent, a rheological modifier, and combinations or derivatives thereof.

Nanocellulose materials provided herein are suitable as strength-enhancing additives for renewable and biodegradable composites. The cellulosic nanofibrillar structures may function as a binder between two organic phases for improved fracture toughness and prevention of crack formation for application in packaging, construction materials, appliances, and renewable fibers.

Other potential applications include, but are not limited to, barrier films, antimicrobial films, transparent films, flexible displays, reinforcing fillers for polymers, biomedical implants, pharmaceuticals, drug delivery, fibers and textiles, templates for electronic components, separation membranes, batteries, supercapacitors, and electroactive polymers.

Other applications suitable to the present invention include reinforced polymers, high-strength spun fibers and textiles, advanced composite materials, films for barrier and other properties, additives for coatings, paints, lacquers and adhesives, switchable optical devices, pharmaceuticals and drug delivery systems, bone replacement and tooth repair, improved paper, packaging and building products, additives for foods and cosmetics, catalysts, and hydrogels.

Nanocellulose materials with hemp or hemp components are suitable for composite and cement additives allowing for crack reduction and increased toughness and strength. Foamed, cellular nanocellulose-hemp hybrid materials allow for lightweight structures with increased crack reduction and strength.

The present invention also provides systems configured for carrying out the disclosed processes, and compositions produced therefrom. Any stream generated by the disclosed processes may be partially or completed recovered, purified or further treated, and/or marketed or sold.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well.

What is claimed is:

1. A composite material comprising nanocellulose and a hemp-derived component selected from the group consisting of hemp bast fibers, hemp inner fibers, hemp shives, hemp leaves, hemp seeds, ground hemp, and combinations thereof, wherein said nanocellulose is present at a concentration from about 1 wt % to about 90 wt % of said composite material, and wherein said hemp-derived component is present at a concentration from about 10 wt % to about 99 wt % of said composite material.

2. The composite material of claim 1, wherein said composite material comprises from about 10 wt % to about 90 wt % of said nanocellulose, and wherein said composite material comprises from about 10 wt % to about 90 wt % of said hemp-derived component.

3. The composite material claim 1, wherein said hemp-derived component is substantially pure hemp.

4. The composite material of claim 1, wherein said composite material contains chemically modified hemp components.

5. The composite material of claim 1, wherein said composite material further comprises one or more additives selected to modify mechanical, thermal, chemical, and/or electrical properties of said composite material.

6. The composite material of claim 1, wherein said composite material further comprises an additive selected from the group consisting of lime, sand, gravel, crushed stone, slag, recycled concrete, geosynthetic aggregates, and combinations thereof.

7. The composite material of claim 6, wherein said additive is lime and wherein said composite material is in the form of a construction block, panel, or other building object.

8. The composite material of claim 1, wherein said composite material is present in a construction block or panel.

9. The composite material of claim 1, wherein said composite material is present in an engineered part.

10. The composite material of claim 1, wherein said composite material is present in a fire-resistant object.

11. The composite material of claim 1, wherein said composite material is present in a coating.

12. The composite material of claim 1, wherein said composite material is present in a container.

13. The composite material of claim 1, wherein said composite material is present in a textile composition.

14. The composite material of claim 1, wherein said composite material is present in a fabric material.

15. A composite material consisting essentially of nanocellulose and a hemp-derived component selected from the group consisting of hemp bast fibers, hemp inner fibers, hemp shives, hemp leaves, hemp seeds, ground hemp, and combinations thereof, wherein said nanocellulose is present at a concentration from about 1 wt % to about 90 wt % of said composite material, and wherein said hemp-derived component is present at a concentration from about 10 wt % to about 99 wt % of said composite material.

16. The composite material of claim 15, wherein said composite material consisting essentially of from about 10 wt % to about 90 wt % of said nanocellulose, and wherein said composite material consisting essentially of from about 10 wt % to about 90 wt % of said hemp-derived component.

17. The composite material claim 15, wherein said hemp-derived component is substantially pure hemp.

18. The composite material of claim 15, wherein said composite material contains chemically modified hemp components.

19. A process of producing a composite material, said process comprising:
   (a) obtaining nanocellulose;
   (b) obtaining a hemp-derived component;
   (c) separately from steps (a) and (b), blending said nanocellulose with said hemp-derived component, thereby forming a composite material comprising said nanocellulose and said hemp-derived component; and
   (d) recovering said composite material,
   wherein said hemp-derived component is selected from the group consisting of hemp bast fibers, hemp inner fibers, hemp shives, hemp leaves, hemp seeds, ground hemp, and combinations thereof, wherein said nanocellulose is present at a concentration from about 1 wt % to about 90 wt % of said composite material, and wherein said hemp-derived component is present at a concentration from about 10 wt % to about 99 wt % of said composite material.

20. The process of claim 19, wherein said composite material comprises from about 10 wt % to about 90 wt % of said nanocellulose, and wherein said composite material comprises from about 10 wt % to about 90 wt % of said hemp-derived component.

\* \* \* \* \*